United States Patent [19]

Cherny

[11] Patent Number: 5,852,808
[45] Date of Patent: Dec. 22, 1998

[54] METHOD AND APPARATUS FOR PROVIDING PROFESSIONAL LIABILITY COVERAGE

[75] Inventor: Julius Cherny, Monsey, N.Y.

[73] Assignee: Mottola Cherny & Associates, Inc., New York, N.Y.

[21] Appl. No.: 420,364

[22] Filed: Apr. 11, 1995

[51] Int. Cl.$^6$ .................................................. G06F 157/00
[52] U.S. Cl. .................................................................. 705/4
[58] Field of Search ................................... 364/401, 406; 395/204, 201; 705/1, 4, 8, 10

[56] References Cited

U.S. PATENT DOCUMENTS 4,856,788   8/1989   Fischel ..................................... 273/256

OTHER PUBLICATIONS

Dantzig, G.B., *Linear Programming Extensions* (Princeton University Press, Princeton, New Jersey, 1963), pp. 499–513.
Fama, E.F., *Foundations of Finance: Portfolio Decisions and Securities Prices* (Basic Books, Inc., New York, 1976), pp. 260–270.
Fisz, M., *Probability Theory and Mathematical Statistics* (Robert E. Krieger Publishing Company, Malabar, Florida, 1963), pp. 89–91.
Johnson, R.A., et al., *Applied Multivariate Statistical Analysis* (Prentice–Hall, Inc., Englewood Cliffs, New Jersey, 1992), pp. 140–145.
Markowitz, H.M., *Portfolio Selection: Efficient Diversification of Investments* (John Wiley & Sons, Inc., New York, 1959), pp. 407–419.
Strang, G., *Introduction to Applied Mathematics* (Wellesley–Cambridge Press, Wellesley, Massachusetts, 1986), pp. 96–107.
Varian, H.R., ed., *Economic and Financial Modeling with Mathematica®*(TELOS, the Electronic Library of Science, Santa Clara, California, 1993), pp. 1–16.
Wagner, H.M., *Principles of Operations Research (With Applications to Managerial Decisions)* (Prentice–Hall, Inc., Englewood Cliffs, New Jersey, 2nd ed. 1975), pp. 223–234.
Wonnacott, T.H., et al., *Introductory Statistics for Business and Economics* (John Wiley & Sons, Inc., New York, 1972), p. 163–165, 398–399.
Yamane, T., *Mathematics for Economists: An Elementary Survey* (Prentice–Hall, Inc., Englewood Cliffs, New Jersey, 2nd ed. 1968), pp. 196–221, 472–493.
"Luxembourg: Office du Ducroire (ODL)", Project & Trade Finance World Export Credit Guide pp. 82–84 Sep. 1994.

*Primary Examiner*—Gail O. Hayes
*Assistant Examiner*—Frantzy Poinvil
*Attorney, Agent, or Firm*—Fish & Neave; Jeffrey H. Ingerman

[57] ABSTRACT

A system and method are provided that, in the case of professionals having large numbers of publicly traded corporate clients, are able to use the relative probabilities of different ones of those clients suffering a professional liability triggering event and the likely relative impact of such an event on different clients, to provide professional liability coverage at either lower cost to the professional or higher profits to the provider. The right to deliver securities in the publicly traded client companies at any time during the coverage period, at the price in effect at the starting date, is secured. The covered professional or its insurer is granted the qualified right to sell those securities at the starting price. If the value of a company falls because of a professional liability triggering event, the covered party is allowed to exercise that right to sell. To exercise the right to sell, the party will be able to buy the securities at the then current reduced price, thus reaping as a gain substantially the amount of potential claims against it.

110 Claims, 6 Drawing Sheets

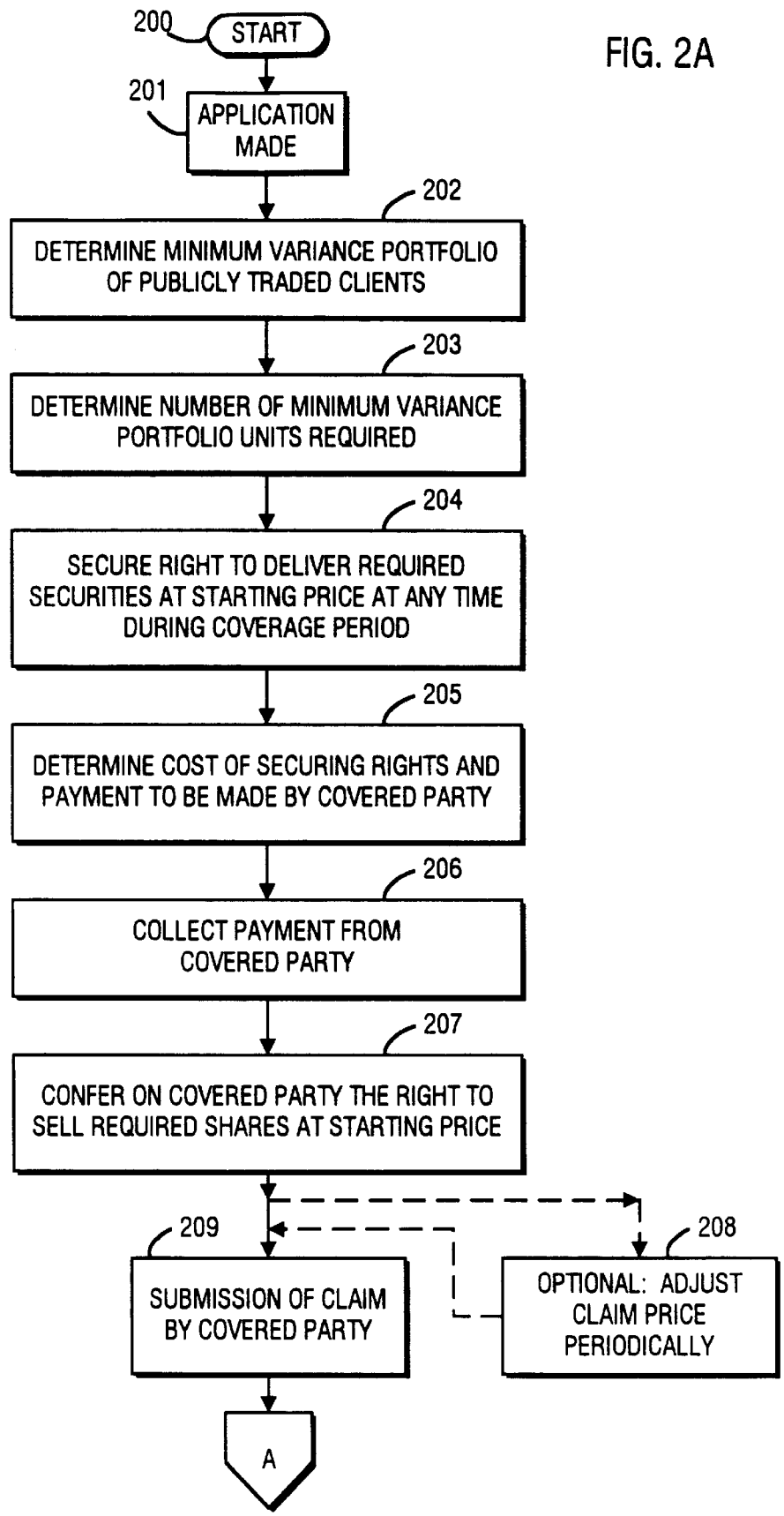

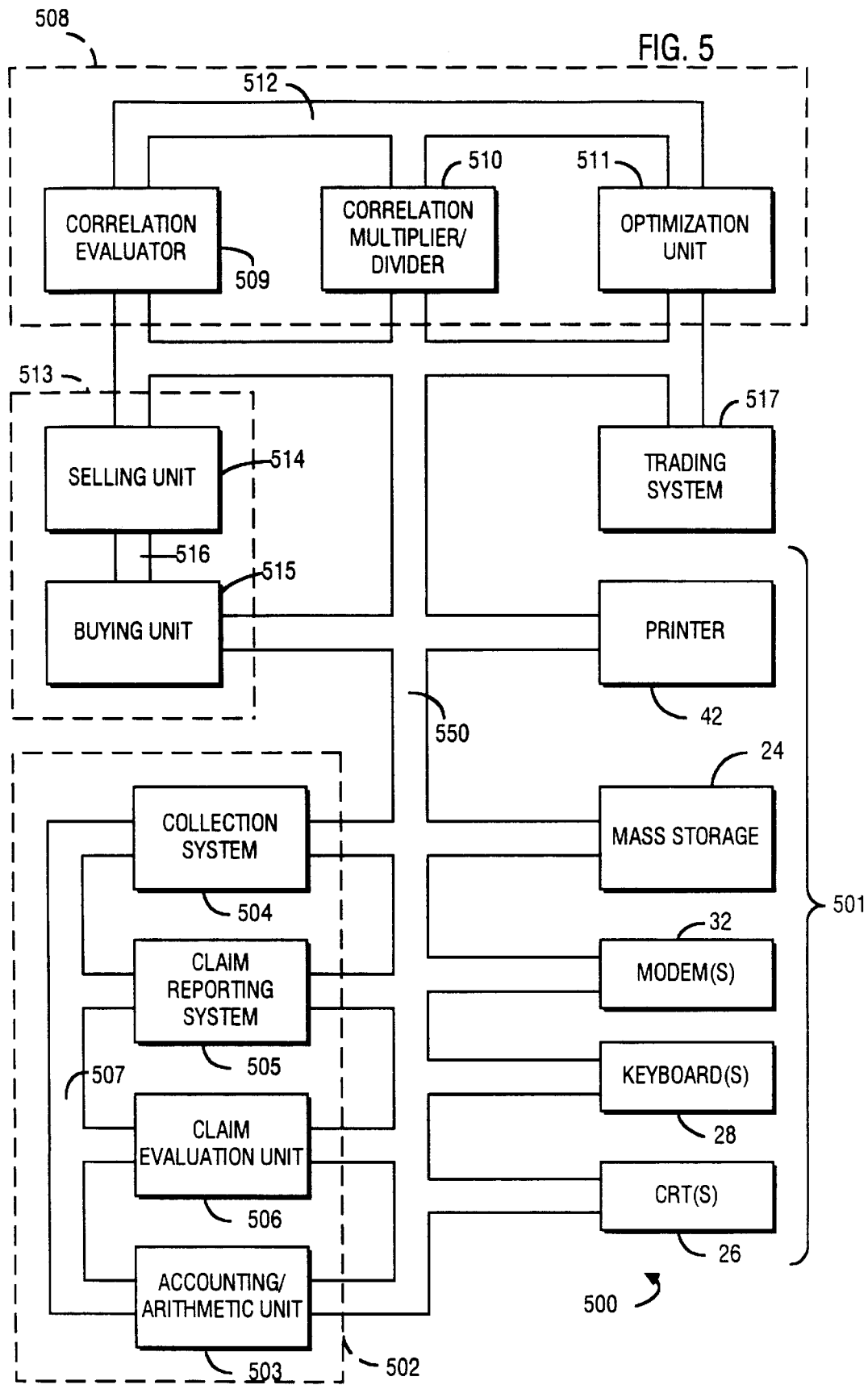

METHOD AND APPARATUS FOR PROVIDING PROFESSIONAL LIABILITY COVERAGE

BACKGROUND OF THE INVENTION

This invention relates to a method and apparatus for providing professional liability coverage. More particularly, this invention relates to a method and apparatus for providing professional liability coverage to professionals whose clients include a substantial number of publicly traded corporations with respect to whom a professional liability triggering event causes a decline in stock price. Most particularly, this invention relates to such method and apparatus for using the decline in stock price to offset the amount paid in claims by the coverage provider to the covered professional.

Traditional insurance of any kind relies on statistics and probabilities. The insurer insures a large number of insureds against a particular peril, charging premiums to each and relying on the likelihood that the peril will only come to pass for a small number of the insureds. As long as the premiums are high enough, the insurer will make a profit after payment of any claims. Typically, the premiums will be invested to generate additional income. An insurer may investigate potential insureds to determine whether or not their behavior makes them more likely than average to suffer the peril to be insured against, turning down those who exhibit risky behavior, or charging a higher premium. In any event, however, ignoring investment income on premiums collected, the insurer's profit depends on collecting more in premiums than it pays in claims. There is no other known mechanism for offsetting those claims.

Professional liability insurance for professionals whose clients are large corporations and whose professional misconduct may result in multimillion-dollar changes in the value of those corporations, is no different from other insurance. Insurers write professional liability coverage for such professionals and charge very large premiums, so that on average they take in more in premiums than they pay in claims when there is a claim against the professional by the stockholders of such a corporation. For example, in the case of an accounting firm having major corporations as its clients, stockholders of one of those corporations may have a large claim against the firm in case of an audit failure—i.e., the failure of an audit to uncover an irregularity that should have been uncovered, if the stockholders relied on the audit in maintaining or increasing their holdings and the value of those holdings falls when the irregularity is discovered. Similarly, such a claim may arise against a law firm if an ill-considered opinion is rendered to a large corporation and is relied on by stockholders in the same way, and then the value of their holdings falls when the subject matter of the opinion comes to pass.

For professionals having such large corporate clients, it ought to be possible to determine, for each pairing of one client with any other client, the relative probabilities of different members of that pair of clients suffering a professional liability triggering event—e.g., an audit failure in the case of an accounting firm—and the likely relative impact on the members of that pair of clients. However, to date, those relationships have not been used to enhance the ability of an insurer, or other professional liability coverage provider, to provide such coverage at either lower cost to the professional or higher profits to the provider.

It would be desirable in the case of professionals having large numbers of publicly traded corporate clients to be able to use the relative probabilities of different ones of those clients suffering a professional liability triggering event and the likely relative impact of such an event on different clients, to provide professional liability coverage at either lower cost to the professional or higher profits to the provider.

SUMMARY OF THE INVENTION

It is an object of this invention in the case of professionals having large numbers of publicly traded corporate clients to use the relative probabilities of different ones of those clients suffering a professional liability triggering event and the likely relative impact of such an event on different clients, to provide professional liability coverage at either lower cost to the professional or higher profits to the provider.

In accordance with the present invention, there is provided a method of providing professional liability coverage to a professional, during a coverage period having a starting date and an ending date, when the professional has clients including a substantial number of publicly traded corporations each having a respective securities price at a respective starting price on the starting date, and with respect to whom a professional liability triggering event could cause a decline in the respective securities price. The method includes determining a respective number of positions in securities of each of the publicly traded corporations needed to provide the professional liability coverage, based on market correlation between prices of securities of the publicly traded corporations, and on at least one of (a) the probability that a professional liability triggering event will occur relative to any one or more of said publicly traded corporations, and (b) likely effect of that professional liability triggering event on the price of securities of the one or more publicly traded corporations. At a respective cost a right is secured to deliver at a respective delivery price, at any time at least as late as the ending date, the respective number of positions in securities of each of the publicly traded corporations. From the respective costs, a payment to be charged to said professional in exchange for the coverage is determined. In exchange for the payment, a right to sell, at a respective claim price, at any time during the coverage period, up to the respective number of positions in securities of any one of the publicly traded corporations, when there is a professional liability triggering event with respect to any of said publicly traded corporations, is conferred on the covered party. A coverage document setting forth the payment and evidencing the right to sell is generated.

Apparatus for performing the method is also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 2A and 2B (hereinafter collectively "FIG. 2") are a flowchart illustrating a preferred embodiment of the method according to this invention;

FIG. 5 is an illustration of a second preferred embodiment of a hardware system according to the present invention.

DETAILED DESCRIPTION OF THE INVENTION

Figure 1:
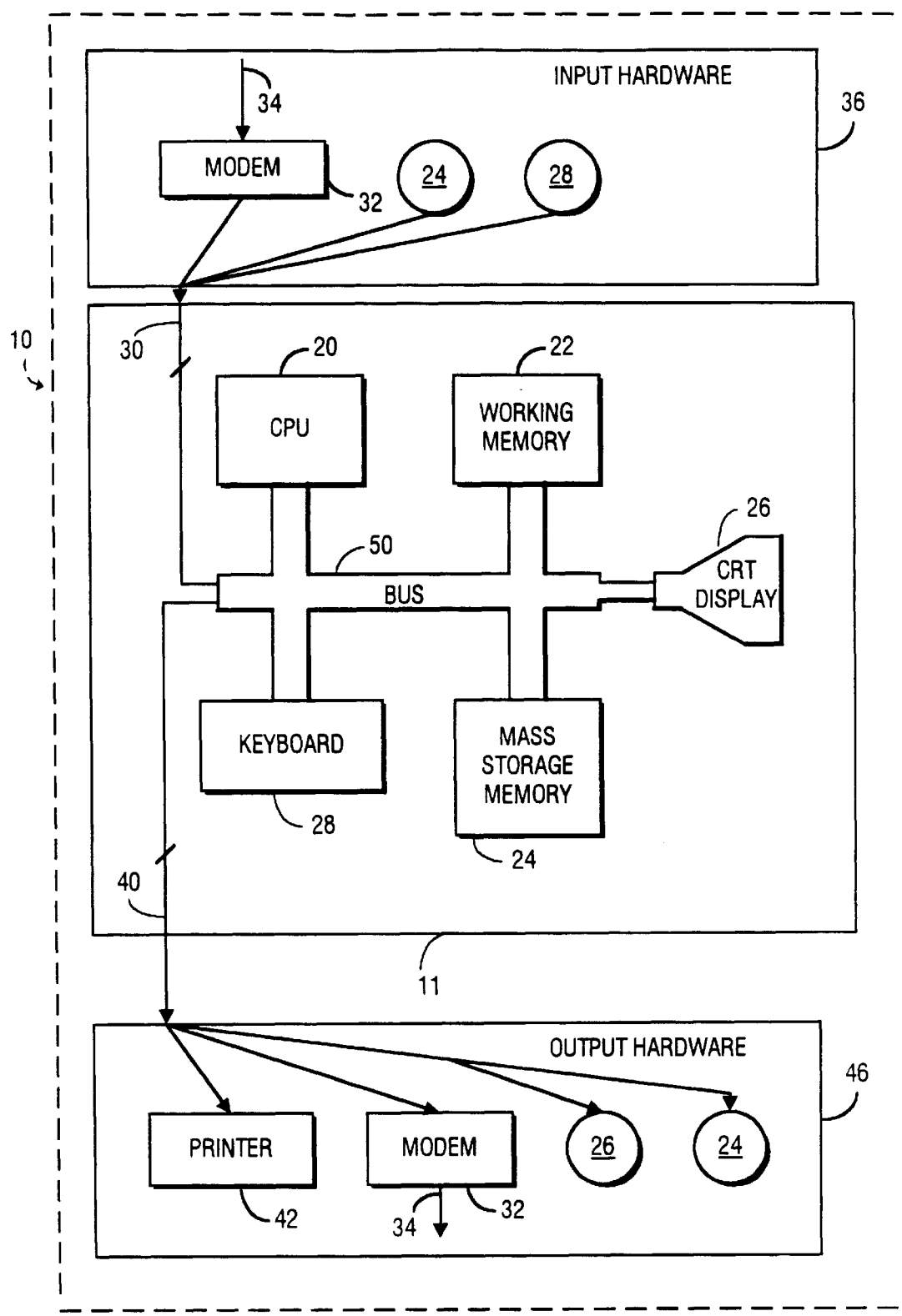
FIG. 1 is a schematic view of a first preferred embodiment of a hardware system according to the present invention.

The present invention is based on the existence, in the capital markets, of instruments and mechanisms that allow an investor not only to purchase shares of a publicly owned corporation or other securities related to the current value of a corporation (e.g., bonds, etc.), but also to purchase the right to buy or sell securities at a later date at a fixed price and to sell securities that one does not own for delivery at a later date. Examples of some of these latter types of instruments and mechanisms are puts (right to sell at a fixed price), calls (right to buy at a fixed price), and short sales (sale for delivery at a later date). The invention is further based on the willingness of potential investors to assume varying degrees of risk in trading in such instruments and relying on such mechanisms.

The invention provides professional liability coverage to professionals who have as clients publicly traded corporations. Instead of relying on statistical probabilities over a large number of clients and insureds as in the case of professional liability insurance, coverage provided according to the present invention takes advantage of the fact that damages, and therefore claims to be covered, in a professional liability situation are based on a change in value of securities of the affected client, and uses that change in value itself to at least partially, if not totally, offset the claim to be paid. The coverage can be provided directly to the professional, but because the invention involves trading in the very securities whose value has been adversely affected by an alleged professional liability triggering event, and thus may give rise to ethical difficulties if the professional is seen as trading in those securities, the coverage is more likely to be provided to an insurance company, in a manner analogous to reinsurance. The insurance company would then provide a traditional professional liability insurance policy to the professional. However, the insurance company could make a larger profit and still charge a lower premium to the professional, because its costs would be lower as explained below, or it could further increase its profits at the same level of premium.

In accordance with the invention, at the start of the coverage period, the coverage provider establishes positions in a basket of securities of each of the publicly traded clients of the professional to be covered. Typically, the securities will be shares of stock, but other securities could be used. The distribution of numbers of positions in those securities (e.g., the relative number of shares of stock in each client) is selected in accordance with the invention by computing a minimum variance portfolio of those securities, computed from an adjusted variance-covariance matrix of those securities. The absolute number of positions (e.g., shares) depends on the amount of coverage required or desired by the covered professional or the insurer.

The adjusted variance-covariance matrix is based on a standard variance-covariance matrix, well known in portfolio theory. In such a matrix, the ijth term and the jith term reflect the expected performance of the ith security relative to the jth security based on ordinary market relationships. For example, if all of the securities are issued by companies in one industry, they would all be expected to rise or fall together, and by about the same amount, and thus the ijth term and the jith term in the matrix would be about +1.0.

For companies in related, noncompeting industries, they would all be expected to rise or fall together, but by differing amounts. Thus, e.g., for automobile manufacturers and suppliers, the value of securities of a supplier might be expected to move in the same direction as that of securities of a manufacturer, but, unless the supplier had no non-automotive customers, the magnitude of the movement in value would be different. In such a case, the ijth term and the jith term in the matrix would both be positive, but would have magnitudes other than 1.0. For example, the covariance of a steel company and an automobile company might be about 0.2, because the steel company has other customers, and thus would not suffer a downturn in the automobile market to the same extent as the automobile manufacturer.

For companies in competing industries, the terms would be negative, and the magnitudes would vary. For example, if all travelers travel either by bus or by airplane, the covariance of a bus company and an airline would be −1.0. But because some travelers opt to drive themselves to their destinations, the absolute value of the actual covariance is less than 1.0.

As set forth above, in accordance with the present invention, the standard variance-covariance matrix is preferably adjusted. The adjustments preferably are based on two factors. One factor on which adjustments are preferably based is the relative probability of a professional liability triggering event occurring, and can be referred to as the triggering event index. For example, where the professional to be covered is an accounting firm, the liability triggering event might be an audit failure. For the two companies represented by the ijth and jith terms, it is possible to assign a factor for the relative probability of an audit failure occurring. For example, if the ith company is a very large, very widely held company whose management owns a small percentage of the company, and the jth company is a relatively small, closely held company whose management owns a large percentage of the company, the jth company would be more likely, statistically, than the ith company to suffer an audit failure, because of the greater likelihood of improperly documented transactions. That greater likelihood can be accounted for according to the present invention in several ways. One relatively simple way is to determine a factor by statistical or actuarial methods that reflects the increased likelihood of an audit failure for the jth company relative to the ith company and then simply multiply both the ijth and jith terms by that factor as the triggering event index. Alternatively, both terms could be divided by that factor, or could be adjusted by a triggering event index derived from those probabilities in a more complex way.

A particularly preferred mathematical representation of an audit failure index AFI (for use where the professional is an accounting firm and the triggering event is an audit failure) for a particular security is:

$$AFI = a_1 x_1 + a_2 x_2 + a_3 x_3 + a_4 x_4 + a_5 x_5$$

where $$a_1 > a_2 > a_3 > a_4 > a_5 > 0 \text{ and } \sum_{i=1}^{5} a_i = 1,$$

and where each $x_i$ is a factor related to the security as follows:

$x_1$: The nature, stability, degree of competition, and general economic health of the industry(ies) in which the entity operates;

$x_2$: Management's reputation, integrity, operating philosophy, financial state, and prior operating results;

$x_3$: The nature, age, size and operating structure of the entity;

$x_4$: The control environment and significant management and accounting policies, practices and methods;

$x_5$: The accounting system and control procedures; each $x_i$ ranging from 1 to 10, with 1 being the best and 10 being the worst. These scoring scales are associated with the different degrees of difficulty in gathering and evaluating the evidentiary material, which is reflected by the related weights $a_i$. Accordingly, AFI can range from 1 to 10.

The second factor on which adjustments are preferably based is the relative amount by which the market value of the two companies would be affected by a liability triggering event, and can be referred to as the market value index. At least in the case where the professional is an accounting firm, in computing the market value index, only the portion of the securities held by the general public, and not by management, is included. That is because any audit failure is likely the result of improper actions by management, and management would not have a cause of action against the accounting firm only the public stockholders would have such a cause of action. However, it is possible that for certain professionals, the management stockholders of the corporation would also have a cause of action, and in such a case, the value of securities held by management would be taken into account.

There are several ways to compute the market value index. For example, if the total value of publicly held securities of the ijth company is ten times that of publicly held securities of the jith company, one or both of the ijth and jith terms could simply be multiplied, or divided, by 10. However, the market value index in accordance with the present invention preferably is computed by taking a value about midway between the two values, such as the average, or the median, of the two values, and then assigning as the market value index for the ijth term the ratio of the value of the ith company to that midway value, and assigning as the market value index for the jith term the ratio of the value of the jth company to the midway value. Each term is then preferably multiplied by its assigned market value index.

Once the adjusted variance-covariance matrix has been formed, a minimum variance portfolio can be determined using optimization techniques in a manner well known in portfolio theory. The optimization techniques that are used generally have, underlying them, some form of differentiation to select a minimum variance. However, the technique applied directly may resort to Lagrangian multipliers or other mathematical optimization techniques, or, increasingly commonly, numerical techniques which are especially well-suited for digital computers.

The result of the optimization of the variance-covariance matrix will be a collection of coefficients or weights $x_{ip}$ representing the relative quantities of securities in each company in which positions should be established to provide the desired coverage in accordance with the invention. If the coefficients are normalized so that they total 1.0, that normalized set of coefficients could be thought of as representing one "unit" of professional liability coverage. The number of "units," and thus the total number of securities of each company, in which positions are to be established would depend on the amount of coverage required of desired by the professional, as discussed below.

In a preferred embodiment of the invention, the computation of weights associated with the securities that comprise the client portfolio is a variant of a known portfolio selection model, whose form is:

Minimize $\sigma^2(R_p)$, $x_{ip}$, $i=1, \ldots, n$ subject to constraints $$\sum_{i=1}^{n} x_{ip}E(R_i) = E(R_e)$$

$$\sum_{i=1}^{n} x_{ip} = 1.0.$$

Where $E(R_e)$ is some given level of expected return for the portfolio, $\sigma^2(R_p)$ stands for the variance of return of the portfolio taken as a whole, and $E(R_i)$ stands for the expected return of security i. The problem stated in the equations is to choose proportions $x_{ip}$, $i=1, \ldots, n$, invested in individual securities that minimize the variance of portfolio return subject to the constraints that expected portfolio return is equal to $E(R_e)$ and that the sum of proportions invested in individual securities is 1.0.

Similarly, the preferred form of the model according to the present invention is:

Minimize $\sigma_2(R_p)$, $x_{ip}$, $i=1, \ldots, n$ subject to the constraints $$\sum_{i=1}^{n} x_{ip}E(R_i) = E(R_e)$$

$$\sum_{i=1}^{n} x_{ip} = 1.0$$

In this model $\sigma^2(R_p)$ stands for the variance of exposure to malpractice liability, $E(R_i)$ denotes liability exposure associated with security i, and $E(R_e)$ the liability exposure of the portfolio taken as a whole.

The general approach to problems of the type described above is to first form the Lagrangian expression $$\sigma^2(R_p) + 2\lambda_e \left[ E(R_e) - \sum_{i=1}^{n} x_{ip}E(R_i) \right] + 2\Phi_e \left[ 1 - \sum_{i=1}^{n} x_{ip} \right],$$

where $2\lambda_e$ and $2\Phi_e$ are the Lagrange multipliers for the constraints. Minimizing the variance of portfolio return subject to the constraints involves differentiating the Lagrangian expression with respect to $2\lambda_e$, $2\Phi_e$ and $x_{ip}$, $i=1, \ldots, n$ and setting these partial derivatives equal to 0.0. For $2\lambda_e$ and $2\Phi_e$, this procedure simply tells us that the proportions invested in individual securities must satisfy the constraints. For the $x_{ip}$, $i=1, \ldots, n$, however, the procedure yields the n new conditions $$\sum_{j=1}^{n} \lambda_{je}\sigma_{ij} - \lambda_e E(R_i) - \Phi_e = 0.0, \quad i = 1, \ldots, n,$$

where $x_{je}$, $j=1, \ldots, n$, are the specific proportions invested in individual securities that define the minimum variance portfolio with expected return $E(R_e)$.

It can be shown that after appropriate manipulation and substitution that the following is a form of the equation that can be used:

$$E(R_j) = E(R_{oe}) - [E(R_{oe}) - E(R_e)]\beta_{ei}, \quad i=1, \ldots, n,$$

where $$\beta_{ie} = \frac{cov(R_i, R_e)}{\sigma^2(R_e)}$$

in the risk of security i in the portfolio e measured relative to the risk of the portfolio. $E(R_{oe})$ represents the liability exposure that is uncorrelated with the portfolio of clients; it is in essence the maximum liability that the professional organization believes it is exposed to based on prior experience.

To account for the market value index referred to above, it is preferable to redefine $\beta_{ie}$:

$$\beta_{ie} = \frac{cov(P_i, P_e)}{\sigma^2(P_e)}$$

where $P_i$=price of security i, and $P_e$=an index which is the sum of the prices of the individual securities comprising the client portfolio.

It is also set forth to define $Ex_i=P_i \cdot$(total number of shares of security i held by non-insiders), which is an estimate of the maximum liability that a professional firm faces for the ith client. The total expected liability over all clients is:

$$E[EX] = (1/n) \sum_{i=1}^{n} Ex_i$$

From the above elements, the coefficients $x_{ip}$ are computed in the following manner:

$$x_{ip} = \frac{Ex_i}{E[EX]} (\beta_{ie}) AFI$$

At the start of the coverage period the coverage provider would preferably secure the right to deliver in the future the number of securities—e.g., shares of stock—required to provide the desired coverage. The right secured preferably would include the right to deliver those securities at any time during the coverage period. The price at which the securities are to be delivered preferably would be the price as of the starting date of the coverage period (or some other predetermined delivery price). For example, the provider preferably could sell the shares in the portfolio short at the starting price or some other predetermined delivery price. The provider preferably would then confer on the covered party—the professional or its insurer—the right to sell the shares in the portfolio at the starting price or some other agreed upon claim price. This right preferably also could be exercised at any time during the coverage period.

If a professional liability triggering event were to occur, and the value of the stock of the affected company dropped, the covered party could go out into the market and purchase the affected shares at their new, low, post-event price. The covered party could then exercise its right to sell those shares to the provider at the starting price or other agreed claim price. The covered party thus recovers the amount it is likely to owe in damages (the spread between starting price and post-event price), and thus is now whole. The provider, who now owns the shares at their post-event price, is also whole because it can exercise the right previously secured to deliver the shares at the original starting price or other predetermined delivery price.

The provider's profit, if any, is the result of the differential between the starting price and the delivery price or other claim price. The provider may also charge a fee instead of, or in addition to, that differential.

The right secured by the provider to deliver the shares at the starting price usually also carries with it the obligation to do so. That would certainly be the case if the mechanism used were the short sale described above. The provider may find itself in a difficult situation at the end of the coverage period if there has been no liability triggering event and, through the normal course of events, the price of the portfolio has increased. Because there was no triggering event, the provider will not have acquired the shares from the covered party and will have to acquire them on the open market at the new higher price. To avoid that situation, the provider, as part of securing the right to deliver the securities could also secure the right to acquire the securities at the starting price or some other predetermined buying price. For example, the provider could purchase a simple call option to buy the required securities on the ending date of the coverage period at the starting price or other buying price. The cost of the option, as well as any differential between the starting price and the buying price, could be passed on to the covered party as part of the fee or "premium" for coverage.

The number of "units" required for coverage according to the invention is determined by the amount of coverage desired by the covered party, expressed as both dollar amount and a percentage fall in value to be covered. For example, the covered party may want coverage of $10,000,000.00 for a 50% fall in value.

Given that the number of securities and price observations for a given security will be significant, it is reasonable to assume that the portfolio of securities is a sample from a multivariate normal population which is represented by:

$$\frac{1}{(2\pi)^{xp/2}} \frac{1}{|\Sigma|^{x/2}} e^{-\sum_{j=1}^{n} (x-\mu)'\Sigma^{-1}(x_j-u)/2}$$

of constant density for the p-dimensional normal distribution are ellipsoids defined by x such that $$(x - \mu)' \Sigma^{-1}(x - \mu) = c^2$$

These ellipsoids are centered at $\mu$ and have axes $\pm c\sqrt{(\lambda_i e_i)}$, where $\Sigma e_i = \lambda_i e_i$, i=1, 2, . . . , p.

Beyond i=2, these hyperellipsoids become difficult to deal with. The solution is to collapse the multi-dimensional normal distribution to a univariate normal distribution.

In the situation according to the invention the $P_i$ (i.e., the prices of security i) stand for the $x_i$. Defining a univariate variable as $$S = \sum_{i=1}^{n} P_i$$

and $$\bar{X} = \sum_{i=1}^{n} \mu_i,$$

then it could be standardized as $$Z = \frac{S - \bar{X}}{\sigma(P_e)}$$

There are tables for the standard normal variable Z.

For example, assume that in a given instance there are three securities with $\bar{x}$=$17.42; $\sigma^2$=141.76; $\sigma$=11.91 and that it is desired to ascertain an S that would satisfy the condition that is between $\bar{x}$ minus one standard deviation (or lying at approximately the 16% level) and $\bar{x}$ plus one standard deviation (or lying at approximately the 84% level). From the standard normal distribution tables:

$$5.51 = 17.42 - 11.91$$

and $$29.33 = 17.42 + 11.91$$

Thus S can range from about 5.51 to about 29.33 and it would cover about 84−16=68% of the probability space.

It remains to allocate the 11.91 increase or decrease in total price to the hypothetical securities in the example. For this, the covariance of each security with the portfolio as a whole is calculated. Assume that from the covariance for security i, i=1,2,3, the $\beta_{ip}$ for each security is:

Security 1: β=5.37
Security 2: β=3.75
Security 3: β=2.88
Normalized, the betas become
Security 1: β=0.45
Security 2: β=0.31
Security 3: β=0.24

With these in hand one can compute the individual values of the securities that would sum to either the lower bound of 5.51 or the upper bound of 29.33:

| | | | | | |
|---|---|---|---|---|---|
| Security 1: | 6.25 | − | 5.36 | = | 0.89 |
| Security 2: | 6.25 | − | 3.69 | = | 2.56 |
| Security 3: | 4.92 | − | 2.86 | = | 2.06 |
| | 17.42 | | 11.91 | | 5.51 |
| Security 1: | 6.25 | + | 5.36 | = | 11.51 |
| Security 2: | 6.25 | + | 3.69 | = | 9.94 |
| Security 3: | 4.92 | + | 2.86 | = | 7.78 |
| | 17.42 | | 11.91 | | 29.33 |

The new values lie on the contour of the correct hyper-ellipsoid.

The covered party preferably would be issued a contract, certificate or other written evidence of having paid the "premium" and having received the right to sell the securities at the agreed upon claim price (such as the starting price).

If a covered party suffers a professional liability triggering event as to a particular client, the covered party would make a claim and, assuming that the event came within the terms of any applicable coverage agreement, the provider would allow the covered party to sell an amount of shares of the affected client up to the number represented by the units purchased, at the starting price or other agreed upon claim price. The covered party would presumably have bought those shares on the open market at the post-event price. The provider would then exercise its right to deliver those shares at the starting price or other agreed upon delivery price.

The covered party could find itself recovering more than it planned. For example, if the coverage selected was for a 50% fall in value, but the actual fall in value of the affected client was 75%, the covered party might still be able to recover the full loss if there were other companies in the portfolio which declined in value in the normal course of events. Unless the coverage agreement specifies that only securities of the affected client company can be sold at the starting price, the covered party could sell at their respective starting prices shares of unaffected clients that happened to have declined for other reasons, purchasing them first at their current lower price. It is preferred that such sales be allowed. However, the right to sell preferably could only be exercised if a professional liability triggering event occurred with respect to a client included in the portfolio, and not for other clients outside the portfolio, or when there has been no triggering event.

The coverage provided by the invention could be analogized to a new type of security, which could be referred to as a specialized put option. Like a standard put option, it offers the right to sell at an agreed upon price, but it is specialized in that it is exercisable only on the occurrence of a professional liability triggering event with respect to one of the companies in the portfolio.

The present invention also includes apparatus for implementing the method just described. In addition to record-keeping apparatus for keeping track of covered parties, "premium" payments received, claims made and paid, etc., the apparatus according to the invention includes apparatus for computing the minimum variance portfolio, and specifically for calculating the triggering event index and the market value index. The minimum variance portfolio calculation apparatus can include a programmed general purpose computer, or it can be implement as a special-purpose logic circuit.

The present invention may be implemented on a variety of computer systems—ranging from a modest personal computer (such as one based on the 80X86 series of microprocessors originally developed by Intel Corporation, of Santa Clara, Calif.) equipped with a spreadsheet program such as LOTUS® 1-2-3 (available from Lotus Development Corporation, of Cambridge, Mass.) and other mathematical application programs such as MATHEMATICA® (available from Wolfram Research, Inc., of Champaign, Ill.) to a supercomputer, depending on the number of potential covered parties and the specific mathematical techniques used to implement the invention. An exemplary computer hardware system 10 with which the present invention may be implemented is shown in FIG. 1.

In FIG. 1, which shows a first preferred embodiment of apparatus according to the invention, system 10 includes a computer 11 comprising a central processing unit ("CPU") 20, a working memory 22 which may be, e.g, RAM (random-access memory) or "core" memory, mass storage memory 24 (such as one or more disk drives or CD-ROM drives), one or more cathode-ray tube ("CRT") display terminals 26, one or more keyboards 28, one or more input lines 30, and one or more output lines 40, all of which are interconnected by a conventional bidirectional system bus 50.

Input hardware 36, coupled to computer 11 by input lines 30, may be implemented in a variety of ways. Market value data, and other data such as number of shares outstanding, may be inputted via the use of a modem or modems 32 connected by a telephone line or dedicated data line 34 to an online financial service. Alternatively or additionally, the input hardware 30 may comprise CD-ROM drives or disk drives 24. In conjunction with display terminal 26, keyboard 28 may also be used as an input device.

Output hardware 46, coupled to computer 11 by output lines 40, may similarly be implemented by conventional devices. By way of example, output hardware 46 may include CRT display terminal 26 for displaying the payment to be charged or the mix of stocks of other securities that make up one unit of the minimum variance portfolio. Output hardware might also include a printer 42, so that hard copy output may be produced, or a disk drive 24, to store system output for later use. Where asset trades are to be executed in order to provide coverage to a subscribing covered party, the trading information may be transmitted over telephone or dedicated data lines 34, possibly with the use of modem 32, to cause the trades to be executed.

In operation, CPU 20 coordinates the use of the various input and output devices 36, 46, coordinates data accesses from mass storage 24 and accesses to and from working memory 22, and determines the sequence of data processing steps. Specific references to components of the hardware system 10 are included as appropriate throughout the following description of the processing steps carried out by the hardware system.

Figure 2B:
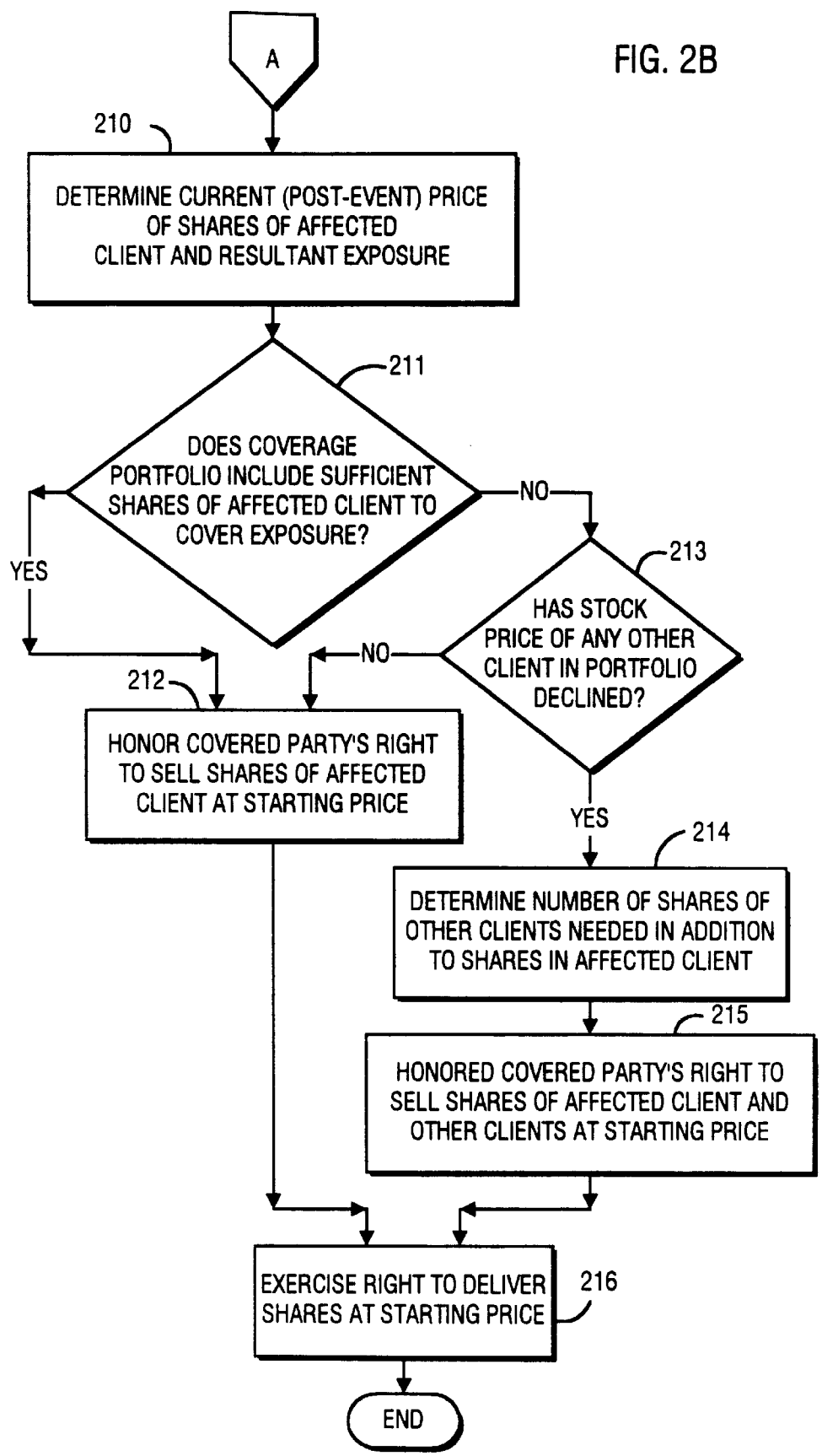

FIG. 2 shows one preferred embodiment 200 of the method according to the invention, particularly as it might be implemented by apparatus 10 to provide coverage to an accounting firm or its insurer. The system starts at step 201 where a potential covered party, such as an accounting firm (or its insurer)—although the invention applies to other professionals, as discussed above, makes an application for coverage. The application would include, in addition to the usual information (name, address, etc.), a list of the publicly traded clients of the firm. The application would also include the desired amount of coverage, expressed as both a dollar limit and a percentage of decline in value, as discussed above and in more detail below. In addition, the application would specify the coverage period by starting date and ending date. The usual coverage period would be one year. The application data would preferably be entered by keyboard 28, although other entry devices, such as optical character readers (not shown), may be used to scan the application, or the application may be provided in a machine readable format for insertion into a disk drive 24 or for transmission over data line 34 for reception via modem 32.

The system then proceeds to step 202, where a minimum variance portfolio of the publicly traded clients is determined, as discussed in more detail below in connection with FIGS. 3 and 4. The minimum variance portfolio represents the relative number of shares (or other securities) of each publicly traded client needed to provide coverage according to the invention with minimum risk. When normalized so that the coefficients sum to 1.0, the coefficients represent one "unit" of coverage. The dollar value of a unit depends on the values of the particular stocks or other securities involved.

Next, the system proceeds to step 203 where the number of units is determined. As discussed above, the number of units is a function of the value of a unit and the dollar value of coverage required, as well as the percentage loss to be covered. Specifically, the potential covered party, or applicant, will be asked to select both a dollar value of coverage desired, and the percentage drop in the value of a client's stock price to be covered. For example, a client may want $30 million in coverage against the possibility that as the result of an audit failure a client's stock price will drop 40%. As discussed above, and in more detail below, this is a partly statistical determination and the covered party may end up being covered for a greater loss. Alternatively, the applicant may specify a desired cost of coverage and the number of units would then be determined simply by the price of a unit, as determined below.

At step 204, the system secures the right to deliver the securities making up the desired number of units of the minimum variance portfolio. A preferred way, but not the only way, of accomplishing this result is to sell short the respective required number of shares of each respective company for delivery at any time prior to or on the ending date of the coverage period at an agreed upon delivery price which is preferably the starting price on the starting date. In addition, it is preferable to purchase a call option securing the right to buy the required number of shares at any time up to and including the ending date at a buying price which preferably is the starting price. The call option protects the coverage provider against the possibility that many or all of the client companies will have risen in value during the coverage period, so that when the time comes to deliver the shares sold short, the provider will not have to purchase the required shares or other securities at the higher market price to deliver them at the starting price.

At step 205, the system determines the payment (analogous to an insurance premium) to be charged to the covered party. In this preferred embodiment, the payment would be the cost of the call option in step 204, plus any transaction costs associated with the short sale (or other transaction) in step 204, plus some profit margin for the coverage provider. This payment can be much smaller than a traditional insurance premium because the coverage provider does not need to worry about spreading risk over a number of covered parties with some probability of claims, and the need to be able to pay those claims and still make a profit. Here, each covered party is separate, and there is substantially no risk; any claim is picked up by the instruments purchased to provide the coverage (or the mechanisms, such as short sales, that are employed).

At step 206, the payment is collected from the covered party. Collection of the payment preferably is entered into system 10 and noted in a file stored in mass storage device 24. In exchange for the payment, at step 207 the provider confers on the covered party the right to sell the required number of shares at a claim price which is preferably the starting price. This right, which can be exercised only if there is a professional liability triggering event (e.g., an audit failure) with respect to one or more clients, can be considered a special, or limited purpose, put option as discussed above.

After step 207, the system may proceed to step 209 as discussed below, or may optionally proceed (perhaps at a higher cost to the covered party) to step 208, where the claim price (i.e., the price at which the limited purpose put option may be exercised in the event of a claim) is adjusted periodically (e.g., monthly or quarterly) during the coverage period. If there is such an adjustment, the provider will have to upgrade the short sale previously made as well as the call option (or other transactions used). The costs of such upgrade would be charged to the covered party. The covered party might be willing to incur such charges because if the stock price increases in the normal course during the coverage period, that would increase the baseline from which a client's stock price could fall, and therefore provide more coverage in the event a claim is necessary.

If the option to adjust the coverage at step 208 is not selected, or after the adjustment in step 208 is made, the system proceeds to step 209 where it awaits submission of a claim. Although not shown, if there is no claim during the coverage period, the provider delivers the securities to complete the short sale. If the value of the various stocks in the portfolio has risen, the provider takes advantage of the call option (paid for by the covered party, so that the provider at worst breaks even) to avoid losing money, while if the values have fallen, the provider may actually make a profit by purchasing the shares at the lower market price and delivering them at the starting price.

If there is a claim at step 209, then the system proceeds to step 210 to determine the current (post-event) price of the affected securities. This information preferably is available to system 10 over communications lines 34 from an online service. The fall in price, multiplied by the number of shares in the hands of the general public (the management stockholders ordinarily would not have a claim), is the maximum exposure of the covered party in a claim for professional malpractice.

Once the exposure has been determined, the system proceeds to test 211 to determine whether or not there are enough shares of the affected client in the coverage portfolio to cover the exposure. If so, the system proceeds to step 212, where the covered party's right to sell the affected shares at their starting price or other claim price (or optional adjusted starting or claim price (step 208)) is honored. The party will presumably by the shares at their new diminished post-event price. This trading in a client's shares, especially after a professional liability triggering event, may result in ethical or other legal problems, and for this reason, as discussed above, the covered party may be the professional's insurer rather than the professional.

If at test 211 it is determined that the affected shares alone will not cover the exposure (because, e.g., the covered party bought enough units to cover a 50% decrease, but the decrease was greater), then the system proceeds to test 213 to determine if other, unaffected companies have decreased in value in the course of normal market fluctuations. If not, the system returns to step 212 and the covered party must be satisfied with the partial coverage that was purchased.

However, if at test 213 it is determined that other companies have decreased in value, then the system proceeds to step 214, where the number of shares in other clients needed to cover the exposure is determined (recognizing that even the maximum available number of shares still may not cover all the exposure). The system then proceeds to step 215 where the covered party's right to sell shares in both the affected client, and any unaffected clients that have declined in value, is honored.

From either step 212 or step 215, the system proceeds to step 216, where the coverage provider exercises the right to deliver the shares, acquired from the covered party at the starting price or other claim price, at the starting price or other agreed delivery price. The provider thus breaks even on these shares, or makes a small profit or loss if the there is a differential between the claim price and the delivery price (where either or both are not equal to the starting price). The system ends the method after step 216.

Figure 3:
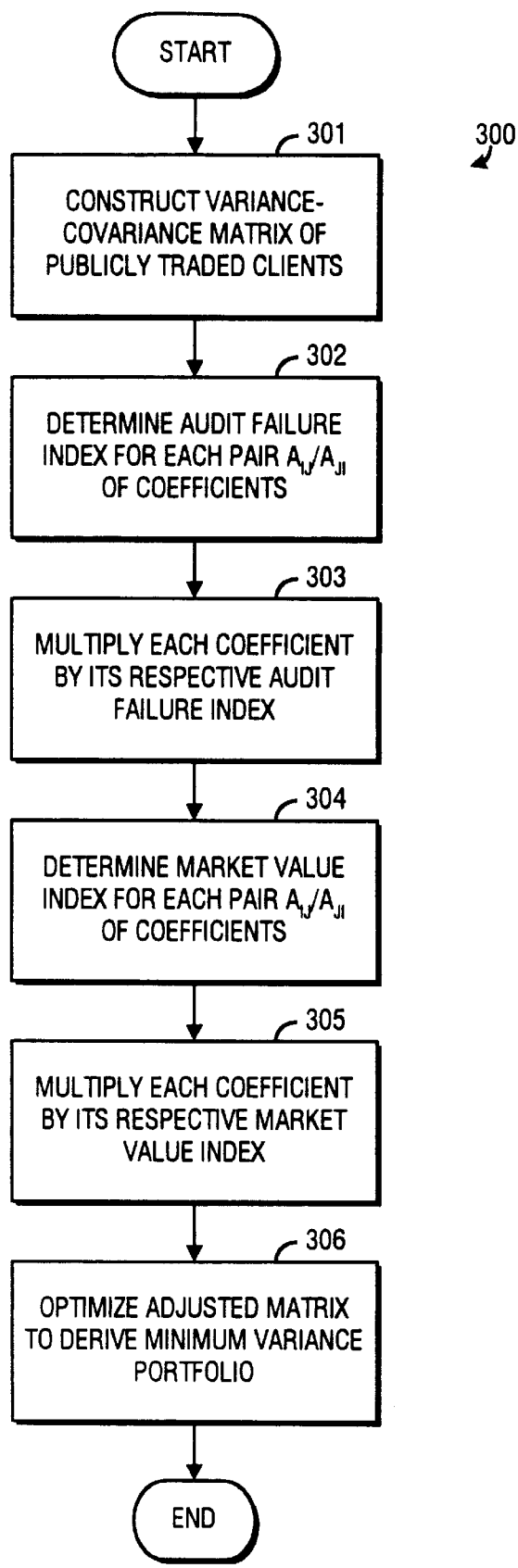
FIG. 3 is a flowchart illustrating a preferred embodiment of the minimum variance portfolio determination step of the method illustrated in FIG. 2.
Figure 4:
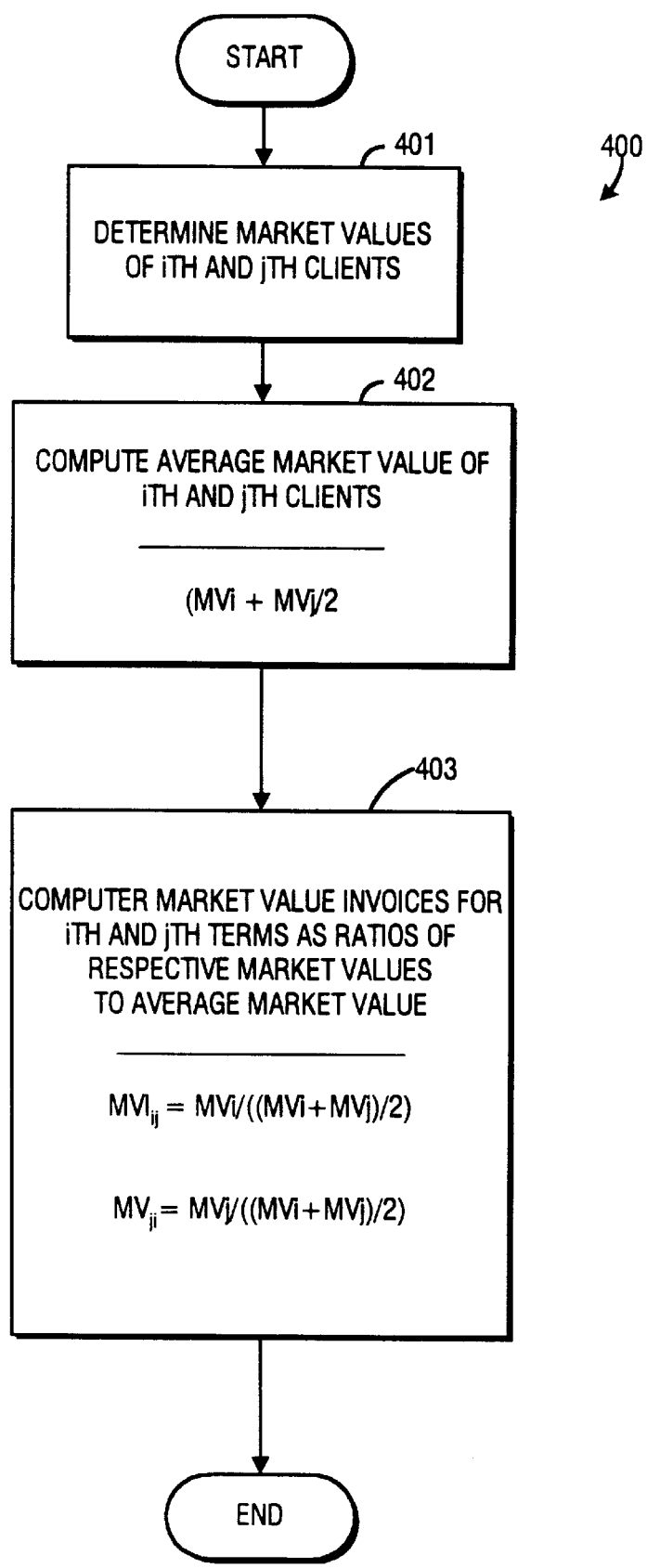
FIG. 4 is a flowchart illustrating a preferred embodiment of the market value index determination step of the method illustrated in FIG. 3.

FIGS. 3 and 4 show one preferred embodiment of a method 300 according to invention by which the system 10 of the invention may carry out step 202 of FIG. 2 to determine the minimum variance portfolio. The system begins at step 301 by constructing a variance-covariance matrix of the publicly traded clients with respect to which coverage is to be provided. The matrix is an n-by-n matrix of coefficients $a_{ij}$ (i=1. . . n, j=1. . . n) representing the relationship of the price of the ith security relative that of the jth security, as explained above. These coefficients are determined by market relationships which may be available to system 10 from an online service via communications line 34, or from a mass storage device 24, such as a CD-ROM that is updated periodically.

After the matrix has been constructed, the system moves on to step 302, where it determines the triggering event index (which in the case of an accounting firm is the audit failure index) for each pair of coefficients $a_{ij}/a_{ji}$. The purpose and meaning of the audit failure index, and the preferred method of determining the index, are described above. At step 303, each coefficient is preferably multiplied by its respective audit failure index, although some other method of taking the index into account (such as dividing instead of multiplying) could be used. The audit failure index preferably is the same for $a_{ij}$ as it is for $a_{ji}$.

Next, at step 304, the market value index for each pair of coefficients $a_{ij}/a_{ji}$ is determined. Again, the significance of the market value index is discussed above, and the preferred method of determining it is described below in connection with FIG. 5. In this case, the preferred market value indices for $a_{ij}$ and $a_{ji}$ are different (except, of course, where i=j). At step 305, each coefficient is preferably multiplied by its respective market value index, although some other method of taking the index into account (such as dividing instead of multiplying) could be used.

After completion of step 305, an adjusted variance-covariance matrix in accordance with this invention has been constructed. At step 306, the adjusted matrix is optimized to find the minimum variance portfolio. Optimization techniques for that purpose are well known as described above. However, it should be pointed out that almost any optimization involves finding a maximum or minimum, and thus most optimization techniques involve, at bottom, some form of differentiation. However, various more sophisticated techniques have been developed to perform the required optimizations. For example, as described above, a Lagrange multiplier may be used. And in any computer implemented system, even for performing a Lagrange multiplier, the ultimate technique used is probably a numerical technique. Method 300 ends after step 306.

FIG. 4 shows a preferred method 400 for performing market value index determining step 304 (FIG. 3). At step 401, the market values of shares in the ith and jth companies (or other securities of those companies) are determined from their current market prices and number of shares (or other securities) outstanding and not held by management. The rapidly changing market price data are most preferably derived from one of the many available online sources via communications line 34 and modem 32. The data on who holds the shares is most preferably derived from mass storage 24 and is updated periodically, although such data may also be available online.

At step 402, the system preferably computes the average (i.e., the arithmetic mean) of the market values of the ith and jth companies, by summing the two market values and dividing by two.

At step 403, the system preferably computes the respective market value indices for the ijth and jith terms by dividing the ith and jth market values, respectively, by the average market value computed in step 402. Because the average market value must by definition be between the ith and jth market values, it is clear that for whichever of the ith and jth companies has the ijth or jith value, the respective ijth or jith market value index will be greater than 1.0 and the other market value index will be less than 1.0.

Process 400 ends after step 403. It will be apparent that other measures of the market value index can be used.

In FIG. 5, which shows a second preferred embodiment of apparatus according to the invention, hardware combination 500 replaces CPU 20 for many of the functions performed by process 300. Although a CPU of some kind will still be used for many of the bookkeeping operations of the system (billing, collection, etc.), in the embodiment of FIG. 6 many of the functions are carried out by special purpose hardware. Although some or all of the dedicated hardware modules could be implemented as single-program general purpose microprocessors, they may also be implemented as hard-wired logic (such as appropriately hard-wired gate arrays). As still another alternative, this hardware combination 500 could be implemented by a programmable logic device ("PLD"), such as the FLEX 8000™ PLD manufactured by Altera Corporation, of San Jose, Calif., coupled to an erasable programmable read-only memory ("EPROM"). One advantage to using a PLD-based hardware system would be the ability to dynamically reconfigure the hardware components.

Apparatus 500 is built around a communications bus 550 similar to bus 50 of FIG. 1. Although not shown in FIG. 5, a CPU similar to CPU 20 may also be included in apparatus 500, connected to bus 550. System 500 also includes input/output devices 501 similar to those in system 10, including one or more mass storage devices 24, one or more CRTs 26, one or more keyboards 28, one or modems 32, and one or more printers 42.

Bookkeeping subsystem 502, whose functions could also be performed by a CPU (not shown) as discussed above, preferably includes an accounting/arithmetic unit 503 for keeping track of the accounts of the various covered parties, a collection system 504 for billing covered parties and keeping track of their payments, and claim reporting system 505 and claim evaluation unit 506 for processing claims by covered parties. Although each module of subsystem 502 is preferably connected directly to bus 550, the modules 503–506 preferably are also interconnected by local bus 507.

Correlation logic 508 is provided to carry out process 300 for deriving the minimum variance portfolio, and includes correlation evaluator 509 for deriving the individual coefficients of the variance-covariance matrix, correlation multiplier/divider unit 510 for determining and applying the audit failure index and the market value index, and optimization unit 511 for deriving the minimum variance portfolio from the adjusted variance-covariance matrix, all preferably interconnected by local bus 512 in addition to being connected to bus 550. To the extent necessary, units 509 and 510 use input/output devices 501 via bus 550 to obtain the data needed for determining the adjusted variance-covariance matrix. Unit 511 performs the optimization described above, using a differentiation circuit as is well known, or using other mathematical techniques, such as described above, preferably implemented in hardware.

A first trading system 513 secures for the coverage provider the rights necessary to deliver the minimum variance portfolio at the required future date. System 513 includes the logic and communications ability (in conjunction with modems 32 available through bus 550) necessary to execute the trades needed to secure those rights. Preferably, system 513 includes selling unit 514 for making the short sales described above, and buying unit 515 for buying the call option described to shield against unexpected increases in market value, interconnected by local bus 516.

A second trading system 517 creates the rights to be conferred on the covered party to sell in the future, at the starting price, shares in the client companies. The necessary data is transferred to subsystem 502, as well as to printer 42 for creation of a coverage document, via bus 550.

It will be understood, as set forth above, that although the preferred embodiments of the invention have been described in connection with shares of stock in the client companies, other securities could also be used to carry out the present invention.

Thus it is seen that a system and method are provided that, in the case of professionals having large numbers of publicly traded corporate clients, are able to use the relative probabilities of different ones of those clients suffering a professional liability triggering event and the likely relative impact of such an event on different clients, to provide professional liability coverage at either lower cost to the professional or higher profits to the provider. One skilled in the art will appreciate that the present invention can be practiced by other than the described embodiments, which are presented for purposes of illustration and not of limitation, and the present invention is limited only by the claims which follow.

What is claimed is:

1. Apparatus for providing professional liability coverage to a professional, during a coverage period having a starting date and an ending date, said professional having clients including a substantial number of publicly traded corporations each having a respective securities price at a respective starting price on said starting date, and with respect to whom a professional liability triggering event could cause a decline in said respective securities price, said apparatus comprising:

correlation logic for determining a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

a first trading system for securing at a respective cost a right to deliver at a respective delivery price, at any time at least as late as said ending date, said respective number of positions in securities of each of said publicly traded corporations;

an arithmetic unit for determining from said respective costs a payment to be charged to said professional in exchange for said coverage;

a second trading system for conferring, in exchange for said payment, a right to sell, at a respective claim price, at any time during said coverage period, up to said respective number of positions in securities of any one of said publicly traded corporations when there is a professional liability triggering event with respect to any of said publicly traded corporations; and a printer for generating a coverage document setting forth said payment and evidencing said right to sell.

2. The apparatus of claim 1 wherein said delivery price is based on said starting price.

3. The apparatus of claim 2 wherein said delivery price is said starting price.

4. The apparatus of claim 1 wherein said claim price is based on said starting price.

5. The apparatus of claim 4 wherein said claim price is said starting price.

6. The apparatus of claim 4 wherein said claim price is said starting price on said starting date and is adjusted periodically during said coverage period based on market fluctuations of said securities price.

7. The apparatus of claim 1 wherein said first trading system comprises a first trading unit for establishing, on said starting date, for later delivery at said delivery price, said respective number of positions in securities of each said publicly traded corporations.

8. The apparatus of claim 7 wherein said first trading unit comprises:

a selling unit for selling, on said starting date, for later delivery at said delivery price, said respective number of positions in securities of each of said publicly traded corporations; and a buying unit for buying on said starting date, at a respective cost, a respective option to buy said respective number of positions in securities of each of said publicly traded corporations at said respective buying price at any time during said coverage period.

9. The apparatus of claim 8 wherein said buying price is based on said starting price.

10. The apparatus of claim 9 wherein said buying price is said starting price.

11. The apparatus of claim 1 wherein said correlation logic comprises:

a correlation evaluator for evaluating, for each one of said publicly traded corporations, a respective one of said market correlations between price of securities of said one of said publicly traded corporations and price of securities of each respective other one of said publicly traded corporations;

a correlation multiplier unit for adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and an optimization unit for deriving from said adjusted correlations a minimum variance portfolio of positions in securities of said publicly traded corporations.

12. The apparatus of claim 11 wherein said optimization unit comprises a differentiation unit.

13. The apparatus of claim 1 further comprising:

a collection system for collecting said payment;

a claim reporting system for monitoring for occurrence of a professional liability triggering event with respect to said professional and a respective one of said publicly traded corporations; and a claim evaluation unit for, on occurrence of a professional liability triggering event with respect to said professional:

evaluating effect of said professional liability triggering event on price of securities of said respective one of said publicly traded corporations and deriving an exposure therefrom based on a post-event price of said securities, honoring said conferred right to sell, at least up to said exposure, thereby acquiring positions in securities of at least said one of said publicly traded corporations at said post-event price, and exercising said right to deliver said positions in securities of at least said one of said publicly traded corporations at said delivery price.

14. Apparatus for providing professional liability coverage to a plurality of professionals, each professional being covered during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said apparatus comprising:

correlation logic for determining, for each said professional, a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

a first trading system for securing, as to each said professional, at a respective cost, the right to deliver at a respective delivery price, at any time at least as late as said ending date, said respective number of positions in securities of each of said publicly traded corporations;

an arithmetic unit for determining from said respective costs, for each said professional, a payment to be charged in exchange for said coverage;

a second trading system for conferring, as to each said professional, in exchange for said payment, a right to sell, at a respective claim price, at any time during said coverage period, up to said respective number of positions in securities of any one of said publicly traded corporations when there is a professional liability triggering event with respect to any of said publicly traded corporations; and a printer for generating a coverage document for each said professional, setting forth said payment and evidencing said right to sell.

15. The apparatus of claim 14 further comprising:

an accounting unit for establishing an account for each of said professionals;

a collection system for collecting said payment and crediting a respective one of said accounts;

a claim reporting system for monitoring for occurrence of a professional liability triggering event with respect to any of said professionals and a respective one of said publicly traded corporations; and a claim evaluation system for, on occurrence of a professional liability triggering event with respect to any one of said professionals:

evaluating effect of said professional liability triggering event on price of securities of said respective one of said publicly traded corporations and deriving an exposure therefrom based on a post-event price of said securities, honoring said conferred right to sell, at least up to said exposure, thereby acquiring positions in securities of at least said one of said publicly traded corporations at said post-event price, and exercising said right to deliver said positions in securities of at least said one of said publicly traded corporations at said delivery price.

16. The apparatus of claim 14 wherein said delivery price is based on said starting price.

17. The apparatus of claim 16 wherein said delivery price is said starting price.

18. The apparatus of claim 14 wherein said claim price is based on said starting price.

19. The apparatus of claim 18 wherein said claim price is said starting price.

20. The apparatus of claim 18 wherein said claim price is said starting price on said starting date and is adjusted periodically during said coverage period based on market fluctuations of said securities price.

21. The apparatus of claim 14 wherein said first trading system comprises a first trading unit for establishing, on said starting date, for later delivery at said delivery price, said respective number of positions in securities of each said publicly traded corporations.

22. The apparatus of claim 21 wherein said first trading unit comprises:
- a selling unit for selling, on said starting date, for later delivery at said delivery price, said respective number of positions in securities of each of said publicly traded corporations; and
- a buying unit for buying on said starting date, at a respective cost, a respective option to buy said respective number of positions in securities of each of said publicly traded corporations at said respective buying price at any time during said coverage period.

23. The apparatus of claim 22 wherein said buying price is based on said starting price.

24. The apparatus of claim 23 wherein said buying price is said starting price.

25. The apparatus of claim 14 wherein said correlation logic comprises:
- a correlation evaluator for evaluating, for each one of said publicly traded corporations, a respective one of said market correlations between price of securities of said one of said publicly traded corporations and price of securities of each respective other one of said publicly traded corporations;
- a correlation multiplier unit for adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and
- an optimization unit for deriving from said adjusted correlations a minimum variance portfolio of positions in securities of said publicly traded corporations.

26. The apparatus of claim 25 wherein said optimization unit comprises a differentiation unit.

27. Apparatus for financing professional liability insurance for a plurality of professionals, each professional being covered by an insurer during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said apparatus comprising:
- correlation logic for determining, for each said professional, a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;
- a first trading system for securing, as to each said professional, at a respective cost the right to deliver at a respective delivery price, at any time as least as late as said ending date, said respective number of positions in securities of each of said publicly traded corporations;
- an arithmetic unit for determining from said respective costs, for each said professional, a payment to be charged to said insurer in exchange for financing said coverage for said professional;
- a second trading system for conferring on said insurer, for each said professional, in exchange for said payment, a right to sell, at a respective claim price, at any time during said coverage period, up to said respective number of positions in securities of any one of said publicly traded corporations when there is a professional liability triggering event with respect to said professional and a respective one of said publicly traded corporations; and
- a printer for generating, for delivery to said insurer, a coverage document as to each said professional, setting forth said payment and evidencing said right to sell.

28. The apparatus of claim 27 further comprising:
- an accounting system for establishing an account for each insurer;
- a collection system for collecting said payment from each insurer as to a respective one of said professionals and crediting said respective account;
- a claim reporting system for monitoring for occurrence of a professional liability triggering event with respect to any of said professionals and a respective one of said publicly traded corporations; and
- a claim evaluation system for, on occurrence of a professional liability triggering event with respect to any one of said professionals and a respective one of said publicly traded corporations:
- evaluating effect of said professional liability triggering event on price of securities of said respective one of said publicly traded corporations and deriving an exposure therefrom based on a post-event price of said securities,
- honoring said right conferred on said one of said insurers at least up to said exposure, thereby acquiring from said one of said insurers positions in securities of at least said one of said publicly traded corporations at said post-event price, and
- exercising said right to deliver said positions in securities of at least said one of said publicly traded corporations at said delivery price.

29. The apparatus of claim 27 wherein said delivery price is based on said starting price.

30. The apparatus of claim 29 wherein said delivery price is said starting price.

31. The apparatus of claim 27 wherein said claim price is based on said starting price.

32. The apparatus of claim 31 wherein said claim price is said starting price.

33. The apparatus of claim 31 wherein said claim price is said starting price on said starting date and is adjusted periodically during said coverage period based on market fluctuations of said securities price.

34. The apparatus of claim 27 wherein said first trading system comprises a first trading unit for establishing, on said starting date, for later delivery at said delivery price, said respective number of positions in securities of each said publicly traded corporations.

35. The apparatus of claim 34 wherein said first trading unit comprises:

a selling unit for selling, on said starting date, for later delivery at said delivery price, said respective number of positions in securities of each of said publicly traded corporations; and a buying unit for buying on said starting date, at a respective cost, a respective option to buy said respective number of positions in securities of each of said publicly traded corporations at said respective buying price at any time during said coverage period.

36. The apparatus of claim 35 wherein said buying price is based on said starting price.

37. The apparatus of claim 36 wherein said buying price is said starting price.

38. The apparatus of claim 27 wherein said correlation logic comprises:

a correlation evaluator for evaluating, for each one of said publicly traded corporations, a respective one of said market correlations between price of securities of said one of said publicly traded corporations and price of securities of each respective other one of said publicly traded corporations;

a correlation multiplier unit for adjusting each of said respective correlations by a factor representing probabilities that professional liability triggering events will occur relative to correlated ones of said publicly traded corporations, and by a factor representing likely effects of said professional liability triggering events on said prices of securities of correlated ones of said publicly traded corporations; and an optimization unit for deriving from said adjusted correlations a minimum variance portfolio of positions in securities of said publicly traded corporations.

39. The apparatus of claim 38 wherein said optimization unit comprises a differentiation unit.

40. Apparatus for providing professional liability coverage to a professional, during a coverage period having a starting date and an ending date, said professional having clients including a substantial number of publicly traded corporations each having a respective securities price at a respective starting price on said starting date, and with respect to whom a professional liability triggering event could cause a decline in said respective securities price, said apparatus comprising:

means for determining a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

means for securing at a respective cost a right to deliver at a respective delivery price, at any time at least as late as said ending date, said respective number of positions in securities of each of said publicly traded corporations;

means for determining from said respective costs a payment to be charged to said professional in exchange for said coverage;

means for conferring, in exchange for said payment, a right to sell, at a respective claim price, at any time during said coverage period, up to said respective number of positions in securities of any one of said publicly traded corporations when there is a professional liability triggering event with respect to any of said publicly traded corporations; and a printer for generating a coverage document setting forth said payment and evidencing said right to sell.

41. The apparatus of claim 40 wherein said delivery price is based on said starting price.

42. The apparatus of claim 41 wherein said delivery price is said starting price.

43. The apparatus of claim 40 wherein said claim price is based on said starting price.

44. The apparatus of claim 43 wherein said claim price is said starting price.

45. The apparatus of claim 43 wherein said claim price is said starting price on said starting date and is adjusted periodically during said coverage period based on market fluctuations of said securities price.

46. The apparatus of claim 40 wherein said means for securing the right to deliver said respective number of securities comprises means for establishing, on said starting date, for later delivery at said delivery price, said respective number of positions in securities of each of said publicly traded corporations.

47. The apparatus of claim 46 wherein said means for establishing positions comprises:

means for selling, on said starting date, for later delivery at said delivery price, said respective number of positions in securities of each of said publicly traded corporations; and means for buying on said starting date, at a respective cost, a respective option to buy said respective number of positions in securities of each of said publicly traded corporations at a respective buying price at any time during said coverage period.

48. The apparatus of claim 47 wherein said buying price is based on said starting price.

49. The apparatus of claim 48 wherein said buying price is said starting price.

50. The apparatus of claim 40 wherein said means for determining said respective number of positions in securities of each of said publicly traded corporations needed to provide said professional liability coverage comprises:

means for evaluating, for each one of said publicly traded corporations, a respective one of said market correlations between price of securities of said one of said publicly traded corporations and price of securities of each respective other one of said publicly traded corporations;

means for adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and means for deriving from said adjusted correlations a minimum variance portfolio of positions in securities of said publicly traded corporations.

51. The apparatus of claim 40 further comprising:

means for collecting said payment;

means for monitoring for occurrence of a professional liability triggering event with respect to said professional and a respective one of said publicly traded corporations; and means for, on occurrence of a professional liability triggering event with respect to said professional:

evaluating effect of said professional liability triggering event on securities of said respective one of said publicly traded corporations and deriving an exposure therefrom based on a post-event price of said securities, honoring said conferred right to sell, at least up to said exposure, thereby acquiring securities of at least said one of said publicly traded corporations at said post-event price, and exercising said right to deliver said positions in securities of at least said one of said publicly traded corporations at said delivery price.

52. Apparatus for providing professional liability coverage to a plurality of professionals, each professional being covered during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said apparatus comprising:

means for determining, for each said professional, a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

means for securing, as to each said professional, at a respective cost, the right to deliver at a respective delivery price, at any time at least as late as said ending date, said respective number of positions in securities of each of said publicly traded corporations;

means for determining from said respective costs, for each said professional, a payment to be charged in exchange for said coverage;

means for conferring, as to each said professional, in exchange for said payment, a right to sell, at a respective claim price, at any time during said coverage period, up to said respective number of positions in securities of any one of said publicly traded corporations when there is a professional liability triggering event with respect to any of said publicly traded corporations; and a printer for generating a coverage document for each said professional, setting forth said payment and evidencing said right to sell.

53. The apparatus of claim 52 further comprising:

means for establishing an account for each of said professionals;

means for collecting said payment and crediting a respective one of said accounts;

means for monitoring for occurrence of a professional liability triggering event with respect to any of said professionals and a respective one of said publicly traded corporations; and means for, on occurrence of a professional liability triggering event with respect to any one of said professionals:

evaluating effect of said professional liability triggering event on price of securities of said respective one of said publicly traded corporations and deriving an exposure therefrom based on a post-event price of said securities, honoring said conferred right to sell, at least up to said exposure, thereby acquiring positions in securities of at least said one of said publicly traded corporations at said post-event price, and exercising said right to deliver said positions in securities of at least said one of said publicly traded corporations at said delivery price.

54. The apparatus of claim 52 wherein said delivery price is based on said starting price.

55. The apparatus of claim 54 wherein said delivery price is said starting price.

56. The apparatus of claim 52 wherein said claim price is based on said starting price.

57. The apparatus of claim 56 wherein said claim price is said starting price.

58. The apparatus of claim 56 wherein said claim price is said starting price on said starting date and is adjusted periodically during said coverage period based on market fluctuations of said securities price.

59. The apparatus of claim 52 wherein said means for securing the right to deliver said respective number of securities comprises means for establishing, on said starting date, for later delivery at said delivery price, said respective number of positions in securities of each of said publicly traded corporations.

60. The apparatus of claim 59 wherein said means for establishing positions comprises:

means for selling, on said starting date, for later delivery at said delivery price, said respective number of positions in securities of each of said publicly traded corporations; and means for buying on said starting date, at a respective cost, a respective option to buy said respective number of positions in securities of each of said publicly traded corporations at a respective buying price at any time during said coverage period.

61. The apparatus of claim 60 wherein said buying price is based on said starting price.

62. The apparatus of claim 61 wherein said buying price is said starting price.

63. The apparatus of claim 52 wherein said means for determining said respective number of positions in securities of each of said publicly traded corporations needed to provide said professional liability coverage comprises:

means for evaluating, for each one of said publicly traded corporations, a respective one of said market correlations between price of securities of said one of said publicly traded corporations and price of securities of each respective other one of said publicly traded corporations;

means for adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and means for deriving from said adjusted correlations a minimum variance portfolio of positions in securities of said publicly traded corporations.

64. Apparatus for financing professional liability insurance for a plurality of professionals, each professional being covered by an insurer during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said apparatus comprising:

means for determining, for each said professional, a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

means for securing, as to each said professional, at a respective cost the right to deliver at a respective delivery price, at any time at least as late as said ending date, said respective number of positions in securities of each of said publicly traded corporations;

means for determining from said respective costs, for each said professional, a payment to be charged to said insurer in exchange for financing said coverage for said professional;

means for conferring on said insurer, for each said professional, in exchange for said payment, a right to sell, at a respective claim price, at any time during said coverage period, up to said respective number of positions in securities of any one of said publicly traded corporations when there is a professional liability triggering event with respect to said professional and a respective one of said publicly traded corporations; and a printer for generating, for delivery to said insurer, a coverage document as to each said professional, setting forth said payment and evidencing said right to sell.

65. The apparatus of claim 64 further comprising:

means for establishing an account for each insurer;

means for collecting said payment from each insurer as to a respective one of said professionals and crediting said respective account;

means for monitoring for occurrence of a professional liability triggering event with respect to any of said professionals and a respective one of said publicly traded corporations; and means for, on occurrence of a professional liability triggering event with respect to any one of said professionals and a respective one of said publicly traded corporations:

evaluating effect of said professional liability triggering event on price of securities of said respective one of said publicly traded corporations and deriving an exposure therefrom based on a post-event price of said securities, honoring said right conferred on said one of said insurers at least up to said exposure, thereby acquiring from said one of said insurers positions in securities of at least said one of said publicly traded corporations at said post-event price, and exercising said right to deliver said positions in securities of at least said one of said publicly traded corporations at said delivery price.

66. The apparatus of claim 64 wherein said delivery price is based on said starting price.

67. The apparatus of claim 66 wherein said delivery price is said starting price.

68. The apparatus of claim 64 wherein said claim price is based on said starting price.

69. The apparatus of claim 68 wherein said claim price is said starting price.

70. The apparatus of claim 68 wherein said claim price is said starting price on said starting date and is adjusted periodically during said coverage period based on market fluctuations of said securities price.

71. The apparatus of claim 64 wherein said means for securing the right to deliver said respective number of positions in securities comprises means for establishing, on said starting date, for later delivery at said delivery price, said respective number of positions in securities of each of said publicly traded corporations.

72. The apparatus of claim 71 wherein said means for establishing positions comprises:

means for selling, on said starting date, for later delivery at said delivery price, said respective number of positions in securities of each of said publicly traded corporations; and means for buying on said starting date, at a respective cost, a respective option to buy said respective number of positions in securities of each of said publicly traded corporations at a respective buying price at any time during said coverage period.

73. The apparatus of claim 72 wherein said buying price is based on said starting price.

74. The apparatus of claim 73 wherein said buying price is said starting price.

75. The apparatus of claim 64 wherein said means for determining said respective number of positions in securities of each of said publicly traded corporations needed to provide said professional liability coverage comprises:

means for evaluating, for each one of said publicly traded corporations, a respective one of said market correlations between price of securities of said one of said publicly traded corporations and price of securities of each respective other one of said publicly traded corporations;

means for adjusting each of said respective correlations by a factor representing probabilities that professional liability triggering events will occur relative to correlated ones of said publicly traded corporations, and by a factor representing likely effects of said professional liability triggering events on said prices of securities of correlated ones of said publicly traded corporations; and means for deriving from said adjusted correlations a minimum variance portfolio of positions in securities of said publicly traded corporations.

76. A method of using a data processing system including a printer to provide professional liability coverage to a professional, during a coverage period having a starting date and an ending date, said professional having clients including a substantial number of publicly traded corporations each having a respective securities price at a respective starting price on said starting date, and with respect to whom a professional liability triggering event could cause a decline in said respective securities price, said method comprising the steps of:

using said data processing system, determining a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations;

using said data processing system to buy and/or sell financial instruments for securing at a respective cost a right to deliver at a respective delivery price, at any time at least as late as said ending date, said respective number of positions in securities of each of said publicly traded corporations;

using said data processing system, determining from said respective costs a payment to be charged to said professional in exchange for said coverage; and using said printer of said data processing system, generating a coverage document conferring, in exchange for said payment, a right to sell, at a respective claim price, at any time during said coverage period, up to said respective number of positions in securities of any one of said publicly traded corporations when there is a professional liability triggering event with respect to any of said publicly traded corporations, said coverage document setting forth said payment and evidencing said right to sell.

77. The method of claim 76 wherein said delivery price is based on said starting price.

78. The method of claim 77 wherein said delivery price is said starting price.

79. The method of claim 76 wherein said claim price is based on said starting price.

80. The method of claim 79 wherein said claim price is said starting price.

81. The method of claim 79 wherein said claim price is said starting price on said starting date and is adjusted periodically during said coverage period, using said data processing system, based on market fluctuations of said securities price.

82. The method of claim 76 wherein said step of securing the right to deliver said respective number of positions in securities comprises using said data processing system to establish, on said starting date, for later delivery at said delivery price, said respective number of positions in securities of each of said publicly traded corporations.

83. The method of claim 82 wherein said step of establishing positions comprises:

using said data processing system, selling, on said starting date, for later delivery at said delivery price, said respective number of positions in securities of each of said publicly traded corporations; and using aid data processing system, buying on said starting date, at a respective cost, a respective option to buy said respective number of positions in securities of each of said publicly traded corporations at a respective buying price at any time during said coverage period.

84. The method of claim 83 wherein said buying price is based on said starting price.

85. The method of claim 84 wherein said buying price is said starting price.

86. The method of claim 76 wherein said step of determining said respective number of positions in securities of each of said publicly traded corporations needed to provide said professional liability coverage comprises:

using said data processing system, evaluating, for each one of said publicly traded corporations, a respective one of said market correlations between price of securities of said one of said publicly traded corporations and price of securities of each respective other one of said publicly traded corporations;

using said data processing system, adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and using said data processing system deriving from said adjusted correlations a minimum variance portfolio of positions in securities of said publicly traded corporations.

87. The method of claim 76 further comprising the steps of:

using said data processing system to process collection of said payment;

using said data processing system, monitoring for occurrence of a professional liability triggering event with respect to said professional and a respective one of said publicly traded corporations; and on occurrence of a professional liability triggering event with respect to said professional;

using said data processing system, evaluating effect of said professional liability triggering event on price of securities of said respective one of said publicly traded corporations and deriving an exposure therefrom based on a post-event price of said securities, honoring said conferred right to sell, at least up to said exposure, using said data processing system to acquire securities of at least said one of said publicly traded corporations at said post-event price, and using said data processing system, exercising said right to deliver said securities of at least said one of said publicly traded corporations at said delivery price.

88. A method for using a data processing system to provide professional liability coverage to a plurality of professionals, each professional being covered during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said process comprising the steps of:

for each said professional:

using said data processing system, determining a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations, using said data processing system to buy and/or sell financial instruments for securing at a respective cost a right to deliver at said respective starting price, at any time at least as late as said ending date, said respective number of positions in securities of each of said publicly traded corporations, using said data processing system, determining from said respective costs a payment to be charged in exchange for said coverage, and using said printer of said data processing system, generating a coverage document conferring, in exchange for said payment, a right to sell, at a respective claim price, at any time during said coverage period, up to said respective number of positions in securities of any one of said publicly traded corporations when there is a professional liability triggering event with respect to any of said publicly traded corporations, said coverage document setting forth said payment and evidencing said right to sell;

using said data processing system, establishing an account for each of said professionals;

using said data processing system to process collection of said payment and to credit a respective one of said accounts;

using said data processing system, monitoring for occurrence of a professional liability triggering event with respect to any of said professionals and a respective one of said publicly traded corporations; and on occurrence of a professional liability triggering event with respect to any one of said professionals:
using said data processing system, evaluating effect of said professional liability triggering event on price of securities of said respective one of said publicly traded corporations and deriving an exposure therefrom based on a post-event price of said securities, honoring said conferred right to sell, as to said one of said professionals, at least up to said exposure, using said data processing system to acquire securities of at least said one of said publicly traded corporations at said post-event price, and using said data processing system, exercising said right to deliver said securities of at least said one of said publicly traded corporations at said delivery price.

89. The method of claim 88 wherein said delivery price is based on said starting price.

90. The method of claim 89 wherein said delivery price is said starting price.

91. The method of claim 88 wherein said claim price is based on said starting price.

92. The method of claim 91 wherein said claim price is said starting price.

93. The method of claim 91 wherein said claim price is said starting price on said starting date and is adjusted periodically during said coverage period, using said data processing system, based on market fluctuations of said securities price.

94. The method of claim 88 wherein said step of securing the right to deliver said respective number of securities comprises using said data processing system to establish, on said starting date, for later delivery at said delivery price, said respective number of positions in securities of each of said publicly traded corporations.

95. The method of claim 94 wherein said step of establishing positions comprises:

using said data processing system, selling, on said starting date, for later delivery at said starting price, said respective number of positions in securities in each of said publicly traded corporations; and using said data processing system, buying on said starting date, at a respective cost, a respective option to buy said respective number of positions in securities of each of said publicly traded corporations at a respective buying price at any time during said coverage period.

96. The method of claim 95 wherein said buying price is based on said starting price.

97. The method of claim 96 wherein said buying price is said starting price.

98. The method of claim 88 wherein said step of determining said respective number of positions in securities of each of said publicly traded corporations needed to provide said professional liability coverage comprises:

using said data processing system, evaluating, for each one of said publicly traded corporations, a respective one of said market correlations between price of securities of said one of said publicly traded corporations and price of securities of each respective other one of said publicly traded corporations;

using said data processing system, adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and using said data processing system, deriving from said adjusted correlations a minimum variance portfolio of positions in securities of said publicly traded corporations.

99. A method for using a data processing system to finance professional liability insurance for a plurality of professionals, each professional being covered by an insurer during a respective coverage period having a starting date and an ending date, each professional having clients including a substantial number of publicly traded corporations each having a respective securities price at a respective starting price on said starting date, and with respect to whom a professional liability triggering event could cause a decline in said respective securities price, said process comprising the steps of:

for each said professional:
using said data processing system, determining a respective number of positions in securities of each of said publicly traded corporations needed to provide said professional liability coverage, based on market correlation between prices of securities of said publicly traded corporations, and on at least one of (a) probability that a professional liability triggering event will occur relative to any one or more of said publicly traded corporations, and (b) likely effect of said professional liability triggering event on said price of securities of said one or more publicly traded corporations, using said data processing system to buy and/or sell financial instruments for securing at a respective cost a right to deliver at a respective delivery price, at any time at least as late as said ending date, said respective number of positions in securities of each of said publicly traded corporations, using data processing system, determining from said respective costs a payment to be charged to said insurer in exchange for financing said coverage for said professional, and using said printer of said data processing system, generating a coverage document for delivery to said insurer conferring on said insurer, in exchange for said payment, a right to sell, at a respective claim price, at any time during said coverage period, up to said respective number of positions in securities of any one of said publicly traded corporations where there is a professional liability triggering event with respect to said professional and a respective one of said publicly traded corporations, said coverage document setting forth said payment and evidencing said right to sell.

100. The method of claim 99 further comprising the steps of:

using said data processing system, establishing an account for each insurer;

using said data processing system to process collection of said payment from each insurer as to a respective one of said professionals and to credit said respective account;

using said data processing system, monitoring for occurrence of a professional liability triggering event with respect to any of said professionals and a respective one of said publicly traded corporations; and on occurrence of a professional liability triggering event with respect to any one of said professionals and a respective one of said publicly traded corporations:

using said data processing system, evaluating effect of said professional liability triggering event on price of securities of said respective one of said publicly traded corporations and deriving an exposure therefrom based on a post-event price of said securities, honoring said right conferred on said one of said insurers, at least up to said exposure, using said data processing system to acquire from said one of said insurers positions in securities of at least said one of said publicly traded corporations at said post-event price, and using said data processing system exercising said right to deliver said positions in securities of at least said one of said publicly traded corporations at said delivery price.

101. The method of claim 99 wherein said delivery price is based on said starting price.

102. The method of claim 101 wherein said delivery price is said starting price.

103. The method of claim 99 wherein said claim price is based on said starting price.

104. The method of claim 103 wherein said claim price is said starting price.

105. The method of claim 103 wherein said claim price is said starting price on said starting date and is adjusted periodically during said coverage period, using said data processing system, based on market fluctuations of said securities price.

106. The method of claim 99 wherein said step of securing the right to deliver said respective number of securities comprises using paid data processing system to establish, on said starting date, for later delivery at said delivery price, said respective number of positions in securities of each of said publicly traded corporations.

107. The method of claim 106 wherein said step of establishing positions comprises:

using said data processing system, selling, on said starting date, for later delivery at said delivery price, said respective number of positions in securities of each of said publicly traded corporations; and using said data processing system, buying on said starting date, at a respective cost, a respective option to buy said respective number of positions in securities of each of said publicly traded corporations at a respective buying price at any time during said coverage period.

108. The method of claim 107 wherein said buying price is based on said starting price.

109. The method of claim 108 wherein said buying price is said starting price.

110. The method of claim 99 wherein said step of determining said respective number of positions in securities of each of said publicly traded corporations needed to provide said professional liability coverage comprises:

using said data processing system evaluating, for each one of said publicly traded corporations, a respective one of said market correlations between price of securities in said one of said publicly traded corporations and price of securities in each respective other one of said publicly traded corporations;

using said data processing system, adjusting each of said respective correlations by a factor representing relative probabilities that professional liability triggering events will occur relative to correlated ones of said publicly traded corporations, and by a factor representing likely relative severity of effects of said professional liability triggering events on said prices of securities of correlated ones of said publicly traded corporations; and using said data processing system, deriving from said adjusted correlations a minimum variance portfolio of positions in securities of said publicly traded corporations.

\* \* \* \* \*

UNITED STATES PATENT AND TRADEMARK OFFICE
CERTIFICATE OF CORRECTION

PATENT NO. : 5,852,808
DATED : December 22, 1998
INVENTOR(S) : Julius Cherny

It is certified that error appears in the above-indentified patent and that said Letters Patent is hereby corrected as shown below:

Column 4, line 58, "σ" should be -- 0 --.

Column 5, line 22, "firm only" should be -- firm. Only --;
line 62, "of" (second occurrence) should be -- or --.

Column 6, line 24, "$\sigma_2(R_p)$," should be -- $\sigma^2(R_p)$, --;
line 67, "$E(R_j) = E(R_{oe}) - [E(R_{oe}) - E(R_e)]\beta_{ei}$, $i=1,\ldots,n$,"
should be -- $E(R_j) = E(R_{oe}) - [E(R_{oe}) - E(R_e)]\beta_{ie}$, $i=1,\ldots,n$, --.

Column 8, line 35:

$$\frac{1}{(2\pi)^{xp/2}} \frac{1}{|\Sigma|^{x/2}} e^{-\sum_{j=1}^{n}(x-\mu)'\Sigma^{-1}(x_j-u)/2}$$

should be:

$$\frac{1}{(2\pi)^{np/2}} \frac{1}{|\Sigma|^{n/2}} e^{-\sum_{j=1}^{n}(x-\mu)'\Sigma^{-1}(x_j-u)/2}$$

line 38, before "of" should be inserted -- Contours --.

Column 10, line 23, "implement" should be -- implemented --;
line 42, "e.g," should be -- e.g., --.

Column 13, line 14, "by" should be -- buy --.

UNITED STATES PATENT AND TRADEMARK OFFICE
CERTIFICATE OF CORRECTION

PATENT NO. : 5,852,808
DATED : December 22, 1998
INVENTOR(S) : Julius Cherny

It is certified that error appears in the above-indentified patent and that said Letters Patent is hereby corrected as shown below:

Column 14, line 51, "ijth or jith" should be -- higher market --;
line 61, "6" should be -- 5 --.

Claim 83, column 27, line 53, "aid" should be -- said --.

Claim 86, column 28, line 13, "system" should be -- system, --

Claim 99, column 30, line 62, after "using" should be inserted -- said --.

Claim 100, column 31, line 38, "system" should be -- system, --.

Claim 106, column 32, line 6, "paid" should be -- said --.

Claim 110, column 32, line 30, "system" should be -- system, --.

Signed and Sealed this

Thirtieth Day of May, 2000

Attest:

Attesting Officer

Q. TODD DICKINSON

Director of Patents and Trademarks